Figure 1:
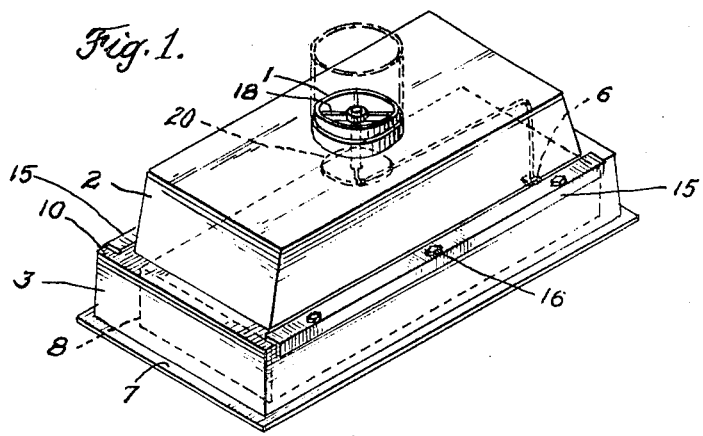

United States Patent
Coward, Jr.

[15] 3,688,477
[45] Sept. 5, 1972

[54] AIR DISTRIBUTION/FILTRATION DEVICE FOR CLEAN ROOMS

[72] Inventor: Charles Coward, Jr., R. D. #1, Box 64, Moorestown, N.J. 08057

[22] Filed: July 1, 1970

[21] Appl. No.: 51,641

[52] U.S. Cl. ..................55/418, 55/484, 55/502, 98/40 D
[51] Int. Cl. ...........................................B01d 51/00
[58] Field of Search..........55/418, 502, 484; 98/40 D

[56] References Cited

UNITED STATES PATENTS

| | | | |
|---|---|---|---|
| 2,923,224 | 2/1960 | Stewart | 98/40 D |
| 3,364,839 | 1/1968 | Sweeney et al. | 98/40 D |
| 3,465,666 | 9/1969 | Knab | 55/484 X |
| 3,479,146 | 11/1969 | Hochman et al. | 55/418 X |
| 3,516,347 | 6/1970 | May | 98/40 D X |
| 3,525,200 | 8/1970 | Smith | 55/484 |
| 3,537,380 | 11/1970 | Spradling et al. | 98/40 D |
| 3,570,385 | 3/1971 | Heisterkamp et al. | 98/40 D X |

Primary Examiner—Robert L. Lindsay, Jr.

[57] ABSTRACT

An air distribution/filtration device containing a removable filter and a deflector plate combination used for supplying clean filtered air to such rooms as laboratories and "white" rooms. The filter is installed on the air leaving side of the deflector plate combination section providing the required filtration just prior to the air entering the work area. The unit is preferably ceiling mounted, but may be also installed on a side wall or on a portable clean bench. Should requirements dictate this unit may be used with a return air plenum located below the work room floor so that the conditioned air may be tempered, re-filtered and returned to the clean work area.

6 Claims, 6 Drawing Figures

PATENTED SEP 5 1972

3,688,477

SHEET 1 OF 2

INVENTOR.
Charles W. Conrad Jr

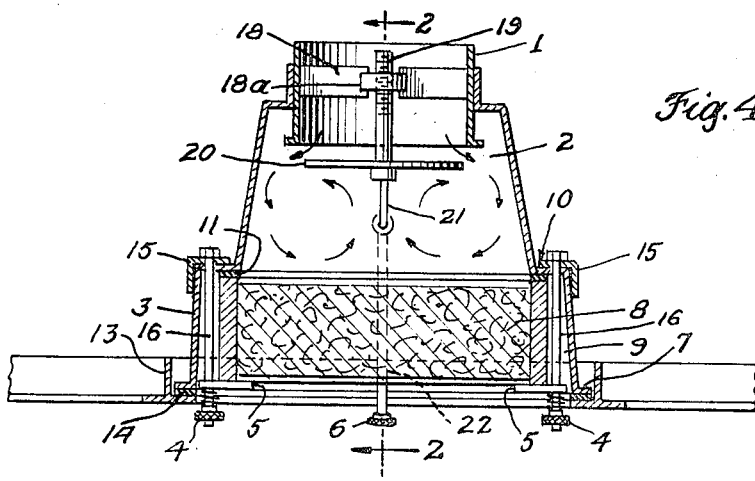
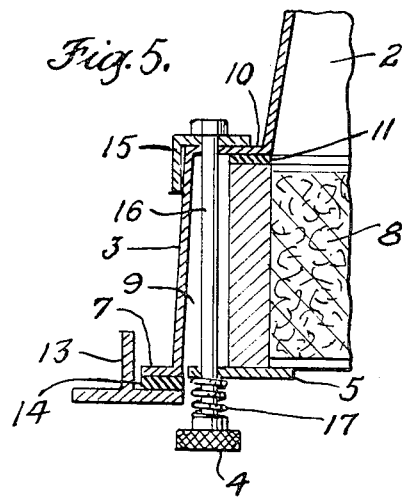
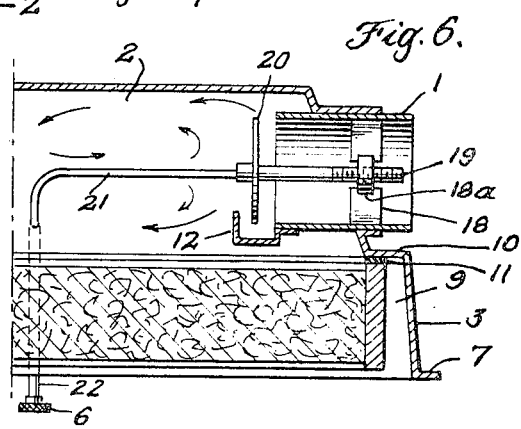

AIR DISTRIBUTION/FILTRATION DEVICE FOR CLEAN ROOMS

BACKGROUND

This invention relates to improvements in air distribution/filtration devices wherein air is required to be distributed within a certain space in a draftless manner and filtered prior to entering the space.

Industrial and medical fields find that many operations, performed in a highly filtered atmosphere offer significantly better results. The effects of "white" rooms are well received and many of these are being added to existing buildings. Several solutions already exist to air filtration and distribution problems in white rooms and the currently most successful method is to filter the air prior to its entrance to the room. Two commercially available types of ceiling filtration systems exist; the first consisting of a field fabricated ceiling framework into which individual filters are placed and the second consisting of a self-contained filter and filter casing which can be installed in a conventional T-Bar ceiling. Disadvantages of the first solution include difficulty in maintaining adequate seals between the filter and the ceiling framework and very poor control of the air distribution over an individual filter and, as a result, over the face of the entire ceiling system. While the second solution provides an adequate seal it only does so at the expense of not being able to replace the filter, i. e., the entire filter and filter casing must be discarded upon contamination of the filter. The user must also purchase the grade of filter offered by the filter casing manufacturer and cannot upgrade or down-grade the filtration level of the work space as dictated by manufacturing requirements. Current manufacturers offering the second solution also offer a simple damper as the method of air volume control. Any damper will only control the volume of air passing through it and not the pattern of air passing through the filter nor will the filter control the air pattern. As a result the supply air continues to maintain a jet-like profile when passing through the filter causing an uneven velocity profile across the filter face. This uneven velocity profile causes turbulent air flow across the working surface and drafty conditions around the workers. This uneven velocity profile also causes uneven build-up of dust in the filter resulting in further stratification of the air through the filter.

OBJECTIVES

It is therefore the object of this invention to provide a Air Distribution/Filtration Device wherein the filter may be removed and replaced with either an equivalent or more or less efficient filter as requirements dictate.

Additionally it is an object of this invention to provide a deflector plate combination and air volume control means which will provide relatively even velocity distribution across the face of the filter and result in essentially a draft free supply of clean air.

Another object of this invention is to provide a Air Distribution/Filtration Device which may be in a modular size so that it may be used in standard ceilings or may with suitable modification, act as a portable air shower over an improvised clean bench.

Another object of this invention is to provide a Air Distribution/Filtration Device which can be pre-calibrated prior to installation permitting rapid and accurate and final prebalancing of the air volume across the ceiling of a room. This is especially useful when a multiplicity of filter casings are being served by the same supply air duct system.

Another object of this invention is to provide a Air Distribution/Filtration Device with a damper control system which by-passes the filter unit entirely and can, therefore, have a permanent seal obviating any potential leakage points.

These and other features of this invention will become obvious to one skilled in the art after review of both this desclosure and the included drawings.

Figure 2:
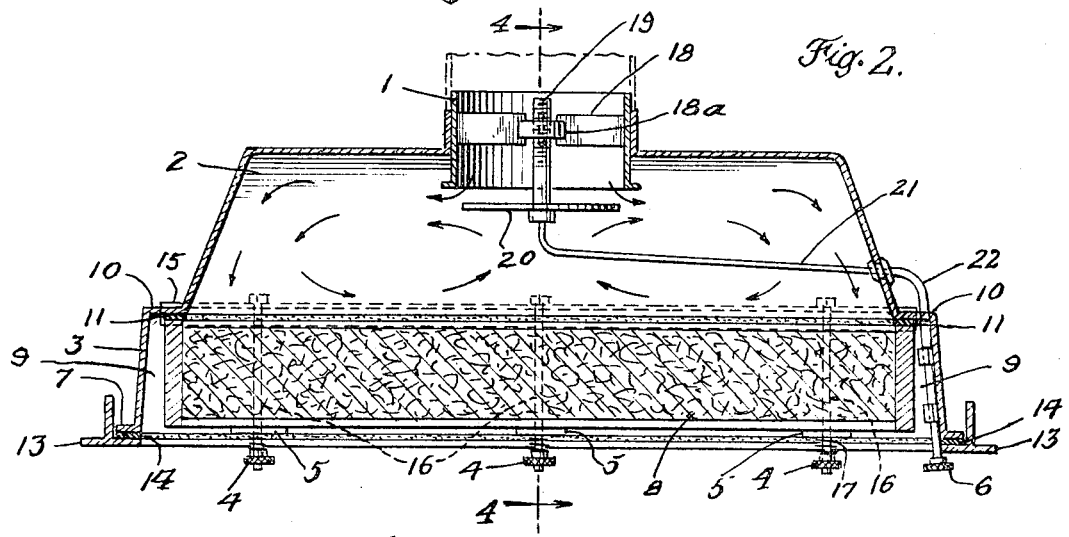
Figure 3:
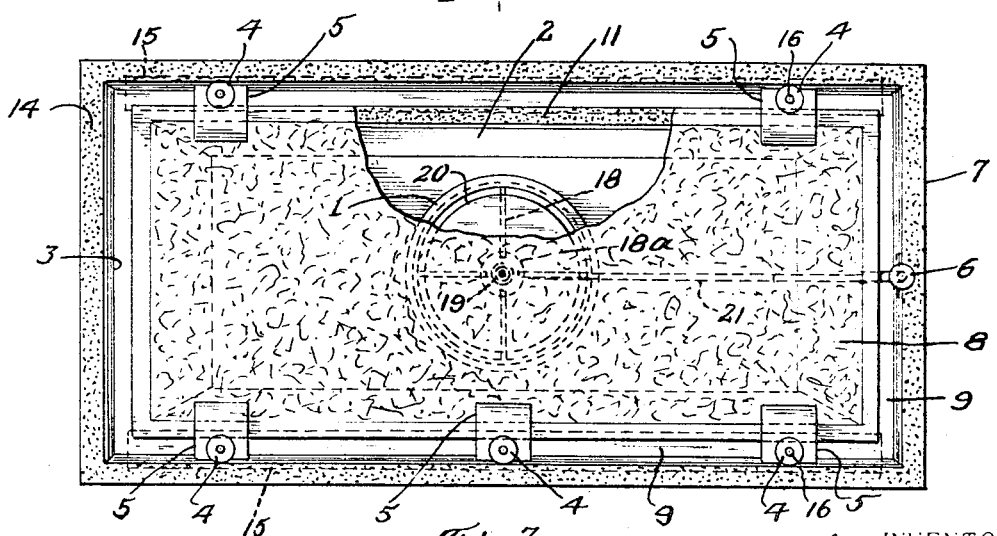

FIG. 1. is an isometric view of an air distribution/filtration device constructed in accordance with the invention;

FIG. 2. is a longitudinal section taken as indicated by the line 2—2 in FIG. 4;

FIG. 3. is a bottom view of FIG. 2 with the structural ceiling members omitted;

FIG. 4. is a cross section taken on the line 4—4 in FIG. 2;

FIG. 5. is a somewhat enlarged fragmentary section of the clamping device shown in FIG. 4;

FIG. 6. is a one-half sectional view of the modification illustrating the deflector plate combination of FIG. 1 mounted in an end wall.

Referring to the Figures in detail, FIG. 1 shows an exterior view of the Air Distribution/Filtration Device detailing the external relationship between such parts as the inlet duct 1, pressure chamber 2 and the filter enclosure 3.

FIGS. 2 and 4 illustrate the components of the Air Distribution/Filtration Device. The inlet duct 1 is attached to the pressure chamber 2 and finally to the filter enclosure 3. A flat portion 10 is included in the pressure chamber 2 forming, by virtue of its shape, a rigid frame against which the filter 8 is compressed. The gasket 11 adjusts for any surface mismatching between the filter 8 and the flat portion 10 and serves as an air seal. The Air Distribution/Filtration Device is provided with a second flat portion 7 which, in the event of a ceiling installation may be installed in a conventional T-Bar ceiling frame. A typical T-Bar ceiling profile is shown at 13 in FIGS. 2 and 4. A strip gasket 14 may be mounted between the flat portion 7 and the T-Bar 13, to permit uniform pressure on the T-Bar.

As will be seen from FIGS. 2 and 4 a preferred form of deflector plate combination is shown consisting of the inlet duct 1, an internal spider-like section 18 having a central nut 18a into which a rod 19 is threaded. This rod 19 is fixedly attached to a rotatable deflector plate 20 which acts both as an air volume control and an air deflector. By rotating the deflector plate 20, the distance between the edge of the deflector plate 20 and the inlet duct 1 is either increased or decreased, which increases or decreases the air volume. This deflector plate also interrupts the natural jet-like column of air passing through the inlet duct 1 and spreads it circumferentially and uniforming around the inner face of the pressure chamber 2. A flexible control cable 21 is fixedly attached to the underside of the deflector plate 20 by means of which this deflector plate is rotated for up and down adjustment.

FIGS. 2 and 4 show in detail the control cable system including the flexible cable 21 and a cable sheath 22 through which the flexible cable 21 rotates. Sheath 22 being permanent can be fixedly attached to pressure chamber 2 and filter enclosure 3 permitting a permanent seal to be maintained where the sheath 22 pierces the pressure chamber 4. This seal being permanent cannot be damaged by operating personnel. The control cable 21 is extended beyond the face of the filter enclosure 3 and is fitted with a control knob 6. Turning control knob 6 turns the control cable 21 which then turns deflector plate 20 increasing or decreasing the air volume.

The bottom view of FIG. 3 details the relationship between such parts as the clamping knobs 4, clamp plates 5 and control knob 6 and flat section 7, filter 8 and space 9.

FIG. 5 shows, in detail, the vice-like clamping mechanism which clamps the filter 8 within the assembly. This clamping mechanism is located in space 9 between said filter enclosure 3 and filter 8. A structural angle 15 acts as a back-up piece to the flat portion 10 insuring no deflection of the flat portion 10 under pressure of the filter 8. Gasket 11 seals any minute mismating surface as described earlier. The structural angle 15 also acts as holder for the rod 16 which is threaded to receive knob 4. A compression spring 17 is located between the knob 4 and the clamp plate 5. The knob 4 is screwed into rod 16 until the pawl 5 contacts the filter 8. The knob 4 is then continuously tightened compressing spring 17 until the spring reaches the proper compression level (about 30 pounds). The combination then of the spring 17 clamp plate 5 and knob 4 will maintain the required compressive force on the filter 8 until the filter 8 has to be changed. Approximately six of these mechanisms should be used per filter assembly.

FIG. 6 is an alternate form of Air Distribution/Filtration Device showing the inlet duct (1) and the preferred form of rotatable deflector plate combination mounted on the side of the pressure chamber 2. A baffle 12 would be added to the inlet duct to prevent direct air impingement on the filter. This form of Air Distribution/Filtration Device is desirable when space above the filter casing is limited. Air flow within this form of pressure chamber is the same as with a top inlet and air flow arrows have been added for clarification.

In the operation of changing filters, knob 4 is backed off rod 16 releasing the spring 17 and clamp plate 5 from the contaminated filter. The contaminated filter may then be removed.

The filter is placed back in the filter assembly. The clamping operation is then the reverse of the removal operation described above.

The deflector plate combination comprising either a fixed or adjustable deflector plate maintains a uniform filter discharge velocity profile in the following manner: The deflector plate interrupts the jet-like column of air entering the pressure chamber and spreads the air uniformly around the inner surfaces of the pressure chamber forming a band of air reducing in velocity as it follows the inner surface of the chamber outwardly away from the deflector plate. This pattern of air creates a low pressure area directly underneath the deflector plate. The combination of this low pressure area and the resistance of the filter draws the air across the face of the filter, into the low pressure area and back into the mainstream of air around the periphery of the deflector plate. As a result of this doughnut-like pattern of air the filter is subject only to the direct impingement of relatively low velocities of air and this only at the corners of the plenum. This air pattern continues until sufficient static pressure is built up within the pressure plenum area above the filter to overcome the resistance of the filter. Since the primary pressure source forcing the air through the filter is static pressure rather than the velocity pressure of an uninterrupted column of air the velocity profile of air leaving the filter will not vary more than 18 to 23 percent from the corners to the center of the filter. Without a deflector plate and depending on velocity pressure as the primary energy source forcing the air through the filter, the velocity profile will show a difference of 120 percent from the corner to the center of the filter.

It may be seen that the device as herein described provides a simple, inexpensive means of distributing filtered air to a work space while retaining not only replaceability of the filter element, but also insuring uniform discharge air velocities. Additionally, the entire assembly when constructed of aluminum and plastic materials is light in weight and easily portable.

Preferred forms of the invention are shown and described herein. However, it must be noted that other modifications can be made to the invention without departing from the letter and the scope of the claims. Examples of these modifications might be the addition of heating and/or cooling coils or variation in damper styles or variations of clamping means.

Having thus described my invention, I claim:

1. A self contained air distribution/filtration device comprising
   a. an air inlet consisting of an inlet duct terminating within a substantially elongated rectangular pressure chamber
   b. an adjustable rotatable flat air deflector plate being movably attached to said inlet duct, located within said pressure plenum and equipped with means for moving said deflector plate toward or away from said inlet duct to control the volume and pattern of air:
   c. a filter enclosure integrally attached to said pressure chamber and located on the air discharge side of said deflector plate, said filter enclosure containing a filter and a means of removably sealing said filter to said pressure chamber in a leak proof manner;
   d. a means for providing air to said inlet duct.

2. An apparatus as described in claim 1 in which means for controlling said deflector plate includes
   a. flexible cable fixedly attached to said deflector plate describing a path around said filter and terminating at one end of the exterior face of said filter enclosure
   b. said flexible cable having a rotatable knob attached to end of said flexible cable in order to rotate said deflector plate.

3. An apparatus as described in claim 1 in which means for controlling said deflector plate includes
   a. means for rotating said deflector plate fixedly attached to said deflector plate, proceeding through said filter and terminating below the exterior face of said filter.

4. An apparatus as described in claim 1 which includes a decorative screen protecting the exterior face of said filter.

5. An apparatus as described in claim 1 which includes an air inlet located on the side of said rectangular elongated pressure chamber;

6. An apparatus as described in claim 1 which includes a clamp means consisting of a. a metallic shape fixedly attached to said filter enclosure,
b. said metallic shape being provided with a threaded means of holding a rotatable fastener in such a position as to removably clamp said filter to said pressure chamber in a leak tight manner.

* * * * *